(12) United States Patent
Lwin et al.

(10) Patent No.: US 12,257,793 B2
(45) Date of Patent: Mar. 25, 2025

(54) FIBRE FORMING PROCESS (71) Applicant: THE UNIVERSITY OF SYDNEY, Sydney (AU)

(72) Inventors: Richard Lwin, Sydney (AU); Simon Charles Fleming, Sydney (AU); Alessio Stefani, Sydney (AU); Md Rejvi Kaysir, Sydney (AU)

(73) Assignee: THE UNIVERSITY OF SYDNEY, Sydney (AU)

( * ) Notice: Subject to any disclaimer, the term of this patent is extended or adjusted under 35 U.S.C. 154(b) by 1057 days.

(21) Appl. No.: 17/268,977

(22) PCT Filed: Aug. 30, 2019

(86) PCT No.: PCT/AU2019/050921
§ 371 (c)(1),
(2) Date: Feb. 17, 2021

(87) PCT Pub. No.: WO2020/041838
PCT Pub. Date: Mar. 5, 2020

(65) Prior Publication Data
US 2022/0194034 A1    Jun. 23, 2022

(30) Foreign Application Priority Data
Aug. 31, 2018   (AU) .............................. 2018903222

(51) Int. Cl.
*B29D 11/00*    (2006.01)
*C08L 33/12*    (2006.01)
(Continued)

(52) U.S. Cl.
CPC ........ *B29D 11/00721* (2013.01); *C08L 33/12* (2013.01); *C08L 75/04* (2013.01);
(Continued)

(58) Field of Classification Search
CPC ....... D01F 6/16; D01F 6/70; B29D 11/00721; C08L 33/12; C08L 75/06; D01D 5/00
See application file for complete search history.

(56) References Cited

U.S. PATENT DOCUMENTS 3,303,169 A    2/1967  Pitzl
4,551,162 A   11/1985  Hicks, Jr.
(Continued)

FOREIGN PATENT DOCUMENTS

CN     104049298 A    9/2014
JP      S5713407 A    1/1982
(Continued)

OTHER PUBLICATIONS

Stefani et al., OAM generation, tunable metamaterials and sensors with highly deformable fibers, Advanced Photonics 2018 (BGPP, IPR, NP, NOMA, Sensors, Networks, SPPCom, SOF) OSA Technical Digest (online) (Optica Publishing Group, 2018), paper NoTh1D.2.

(Continued)

*Primary Examiner* — Emmanuel S Luk
(74) *Attorney, Agent, or Firm* — MARSHALL, GERSTEIN & BORUN LLP (57) ABSTRACT

A fibre drawing method for forming a fibre from a low Young's modulus material.

15 Claims, 5 Drawing Sheets

(51) Int. Cl.
  *C08L 75/04* (2006.01)
  *D01F 6/16* (2006.01)
  *D01F 6/70* (2006.01)
  *B29K 33/00* (2006.01)
  *B29K 75/00* (2006.01)
  *G02B 6/02* (2006.01)

(52) U.S. Cl.
  CPC ............... *D01F 6/16* (2013.01); *D01F 6/70* (2013.01); *B29K 2033/12* (2013.01); *B29K 2075/00* (2013.01); *C08L 2203/12* (2013.01); *G02B 6/02033* (2013.01)

(56) References Cited

U.S. PATENT DOCUMENTS

| | | | | |
|---|---|---|---|---|
| 4,798,814 | A * | 1/1989 | Everitt | C04B 35/62245 501/133 |
| 4,893,897 | A | 1/1990 | Parker et al. | |
| 5,136,763 | A | 8/1992 | Nugent | |
| 5,487,859 | A * | 1/1996 | Aneja | D02J 1/22 264/235.6 |
| 5,851,666 | A | 12/1998 | Nonaka et al. | |
| 7,887,726 | B1 * | 2/2011 | Tsai | C08J 5/046 525/178 |
| 7,892,460 | B1 | 2/2011 | Welker et al. | |
| 2003/0003299 | A1 * | 1/2003 | Johnson | D01F 6/62 428/397 |
| 2004/0042750 | A1 | 3/2004 | Gillberg et al. | |
| 2005/0158542 | A1 * | 7/2005 | Iwata | D01F 6/625 264/211.17 |
| 2005/0232561 | A1 | 10/2005 | Murofushi et al. | |
| 2008/0063968 | A1 * | 3/2008 | Kinoshita | D01D 5/0985 430/105 |
| 2008/0277810 | A1 | 11/2008 | Sato et al. | |
| 2009/0325439 | A1 * | 12/2009 | Kim | D01F 6/62 428/397 |
| 2013/0224468 | A1 * | 8/2013 | Kim | D01D 5/16 428/221 |
| 2016/0357174 | A1 | 12/2016 | Buchak et al. | |
| 2018/0057548 | A1 * | 3/2018 | Breslauer | D01D 5/24 |
| 2018/0087189 | A1 * | 3/2018 | Wetzel | B29C 64/106 |
| 2018/0128970 | A1 | 5/2018 | Homma et al. | |
| 2019/0309448 | A1 * | 10/2019 | Holbert, Jr. | D01D 5/30 |
| 2020/0362475 | A1 * | 11/2020 | Onogi | C08F 116/06 |
| 2021/0186025 | A1 * | 6/2021 | Ortega | D01F 1/103 |

FOREIGN PATENT DOCUMENTS

| | | |
|---|---|---|
| JP | S6155611 A | 3/1986 |
| JP | H10115721 A | 5/1998 |
| JP | 2000147271 A | 5/2000 |
| JP | 2005292656 A | 10/2005 |
| JP | 200752321 A | 3/2007 |
| WO | WO-2003/009028 A1 | 1/2003 |
| WO | WO-03/079073 A1 | 9/2003 |
| WO | WO-2005/096048 A1 | 10/2005 |

OTHER PUBLICATIONS

Fleming et al., Metamaterials fabricated by fibre drawing, 2018 23rd Opto-Electronics and Communications Conference (OECC), IEEE, 2 pages, Jul. 2, 2018.

Kaysir et al., Flexible optical fiber sensor based on polyurethane, 2017 Conference on Lasers and Electro-Optics Pacific Rim (CLEO-PR), IEEE, 2 pages, Jul. 31, 2017.

International Application No. PCT/AU2019/050921, International Search Report and Written Opinion, mailed Sep. 23, 2019.

* cited by examiner

FIBRE FORMING PROCESS

FIELD OF THE INVENTION

The present invention relates to a fibre drawing method for forming a fibre from a low Young's modulus material and to fibres formed from low Young's modulus materials using this method.

BACKGROUND OF THE INVENTION

Optical Fibre Sensors (OFSs) are an existing technology, which offer many inherent advantages over other traditional sensors, such advantages include: being lightweight, resistant to electromagnetic interference, high sensitivity, high-temperature operation, high resistance to corrosion, and large bandwidth. Physically, optical fibres typically consist of a core and a cladding with cylindrically symmetric structure. In general, the core is enclosed by the cladding, which has a relatively lower refractive index so that the light waves are guided through the core via total internal reflection at the interface between the core and the cladding. However, other designs are also used, including hollow core, and these may employ different guiding mechanisms. Despite these differences, broad structural features such as core and cladding are still present and the function is generally still that of guiding light. External effects on the fibre can perturb properties of the guided light such as amplitude, phase, polarization, spectral distribution, reflection, and optical angular momentum. As a result, optical fibres are used to sense a variety of external stimuli, including: electrical, magnetic, thermal, and mechanical perturbations (e.g. strain, pressure, bend, twist, and vibration). Current OFS generally include optical fibres formed from materials that have a high Young's modulus (YM), e.g. >1 GPa, such as polymers or glass.

OFS technology is particularly attractive for application in wearable, implantable, and human-friendly devices as these devices allow both sensing and signal transmission. However, there are a number of issues with the use of high YM materials to form OFS.

One significant issue is that wearable, implantable, and human-friendly devices require the OFS to exhibit a degree of flexibility. In this regard, glass OFSs and polymer OFSs containing glass are unable to withstand the high stresses associated with stretchable applications (such as wearable garments) due to the glass fibre structure being stiff. Furthermore, movement of a body may damage the structure or function of such an OFS device whilst it is worn. In some instances, breakage may result in the formation of glass fibre fragments which are harmful to the human body. As a result, OFS devices formed from glass or including glass are unsuitable for certain applications. While the use of polymers may provide an OFS with some flexibility, the polymers presently used in OFS have a small elastic limit (e.g. poly-methyl methacrylate (PMMA) has elastic limit ~10%). They are also easily damaged, although less likely to break and leave fragments, plastic deformation can render them as inoperable as with a breakage.

Another significant issue relates to the sensitivity of devices formed from high YM materials. OFS devices generally operate by detecting modulations of a transmitted optical signal in response to the perturbations of the surrounding environment. The different sensing mechanisms and designs need to be carefully selected to accommodate a high YM material, so that it is suitably sensitive for use in intended mechanical environments as well as reducing the risk of any permanent mechanical deformation. This is because the intrinsic sensitivity of OFS formed from high YM materials to external measurands is very low. Thus, high YM materials limit the maximum response of the overall sensing system.

The realization of highly stretchable optical fibres formed from a low Young's modulus material, such as soft polymers, are attractive options for such applications. Such optical fibres would permit detection of multiple modes of deformation with high sensitivity and could be used for stretchable applications. This would allow the fibre to be more readily integrated into the fabrics of garments, where it can bend and twist with the movement of the human body without breaking. Thus, fibre sensors made of low YM materials could improve existing uses of OFS technology and open up new opportunities for OFS technology. However, to the inventors' knowledge there is presently no successful scalable inexpensive method for fabricating a low YM fibre.

The typical approach to forming high YM fibres is to use a standard fibre drawing process. Under normal drawing conditions for high YM materials, high tension is applied and maintained at the hard preform, neck down, and fibre region to drive viscous flow in the neck-down region. This is necessary for successful fibre drawing. However, for low YM materials, the preform above and the fibre below the neck down region are relatively much more elastic compared to high YM materials, and during a standard fibre drawing approach these sections exhibit instability due to the neck down position fluctuating with respect to a hot zone of the furnace. This results in the fibre snapping during drawing and/or the formation of fibre slumps (e.g. the resultant fibre has inconsistent diameter). Given these shortcomings, experienced fibre-drawing experts generally consider low YM materials to be incompatible with standard fibre drawing techniques. This is because the material property of a low Young's modulus material (i.e. its low YM) conflicts with the standard fibre drawing process.

Given that fibre drawing techniques are considered to be unsuitable for forming low Young's modulus fibres, a number of different approaches have been investigated for forming low YM fibres. Guo et al. made a step-index structure of hydrogel fibre (YM of ~80 kPa & elastic limit up to 700%) made of alginate-polyacrylamide precursor solution by using polymerization and crosslinking under UV radiation. First, the core (diameter of 250-1000 μm) was fabricated by injecting a $Ca^{2+}$-containing alginate-polyacrylamide precursor solution into a platinum-cured silicone tube mold with a syringe and curing the solution by UV light irradiation. Then, the cladding of the fibre was formed by a 'two-step dip coating method' and the thickness of the cladding layer was controlled by the dipping time, and can be thin (<50 μm) or thick (>500 μm). Guo et. al. demonstrated strain sensing based on monitoring the attenuation of the fibre, and distributed strain sensing by observing absorption spectra of various organic dyes, which are doped into different sections of the same fibre. Later, Cholst made an optical fibre (YM of ~960 kPa & elastic limit up to 300%) with a polystyrene-polyisoprene triblock copolymer core, and a fluorinated thermoplastic elastomer cladding. Fibres having outer diameter of 1300-1600 μm were fabricated by co-extrusion. Both mechanical and optical properties of the fibre were demonstrated without presenting any specific sensing applications.

Both of the above approaches have shortcomings. The fabrication technique (i.e. polymerization and cross-linking) used for hydrogel fibre is not readily scalable (and is therefore expensive) and the optical properties of the resultant fibre largely depend on complex fabrication techniques. As a result, light guidance through the suggested core-cladding fibre structures limits the applications to very short range sensing due to reasonably poor optical material. The co-extrusion method used by Cholst may be scalable. However, with this approach, Cholst did not form any fibre structure <1 mm, thus limiting potential applications. Neither of these techniques allows the practical realization of soft and flexible fibres suitable for practical sensing applications.

An object of the present invention is to address or ameliorate at least one shortcoming of the prior art and/or provide an alternative and/or improved method for forming a fibre from a low YM material.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the invention, there is provided a fibre drawing method for forming a fibre from a low Young's modulus material, the method including:

feeding a low Young's modulus fibre preform into a draw zone of a fibre drawing apparatus, and drawing a fibre from a low Young's modulus material preform at a sufficiently low tension to maintain a neck down region of the low Young's modulus material preform at a neck down position within the draw zone.

In an embodiment, the step of drawing a fibre from the low Young's modulus material preform is performed under a normalised tension of 50 gm-f/mm$^2$ or less. Tension is typically measured in gm-f and normalised to cross-sectional area in mm$^2$, thus in effect the normalised tension is stress (note: 1 gm-f/mm$^2$=9.8×10$^3$ Pa). Preferably, the normalised tension is 45 gm-f/mm$^2$ or less. More preferably, the normalised tension is 40 gm-f/mm$^2$ or less. Even more preferably, the normalised tension is 35 gm-f/mm$^2$ or less. Still more preferably, the normalised tension is 30 gm-f/mm$^2$ or less. Most preferably, the normalised tension is 25 gm-f/mm$^2$ or less.

In a second aspect of the invention, there is provided a fibre drawing method for forming a fibre from a low Young's modulus material, the method including:

feeding a low Young's modulus fibre preform into a draw zone of a fibre drawing apparatus; and drawing a fibre from the low Young's modulus material preform under a normalised tension of 50 gm-f/mm$^2$ or less.

In an embodiment of the second aspect, the normalised tension is 45 gm-f/mm$^2$ or less. Preferably, the normalised tension is 40 gm-f/mm$^2$ or less. More preferably, the normalised tension is 35 gm-f/mm$^2$ or less. Even more preferably, the normalised tension is 30 gm-f/mm$^2$ or less. Most preferably, the normalised tension is 25 gm-f/mm$^2$ or less.

In an embodiment of the second aspect, the method includes maintaining a neck down region of the low Young's modulus material preform at a neck down position within the draw zone.

The skilled person will appreciate that the neck down position can be maintained or controlled by monitoring fibre diameter and tension variation under steady state conditions (e.g. using a fixed fibre preform feed rate, fibre draw rate, furnace temperature, and fibre preform diameter). If the fibre diameter and tension are maintained at a constant level, then the neck down position will be maintained in the draw zone. Fluctuations in the fibre diameter and tension indicate the neck down is moving from its position in the draw zone. Thus, in one or more embodiments of the first and second aspects, the fibre diameter is constant and the tension is constant.

In an embodiment of the first or the second aspects, the low Young's modulus material has a Young's modulus of 300 MPa or less at room temperature. Preferably, the low Young's modulus material has a Young's modulus of 100 MPa or less. More preferably, the low Young's modulus material has a Young's modulus of 50 MPa or less. Even more preferably, the low Young's modulus material has a Young's modulus of 30 MPa or less. Most preferably, the low Young's modulus material has a Young's modulus of 10 MPa or less In an embodiment of the first or the second aspects, the low Young's modulus material is drawn at a draw temperature above the brittle-ductile transition temperature of the low Young's modulus material, but below the melting point of the low Young's modulus material. Preferably, the draw temperature is above the glass transition temperature of the low Young's modulus material.

In an embodiment, the low Young's modulus material is drawn at a draw temperature such that the low Young's modulus material is viscous.

In an embodiment of the first or the second aspects, the low Young's modulus material is selected from the group consisting of: a polymer, rubber, silicone compound, or hydrogel. Preferably, the low Young's modulus material is a polymer. More preferably, the polymer is a thermoplastic elastomer. Most preferably, the low Young's modulus material is a thermoplastic elastomer selected from the group consisting of: polyurethane, poly(styrene-b-(ethylene-co-butylene)-b-styrene), and polystyrene-polyisoprene triblock copolymer.

In an embodiment of the first or the second aspects, the step of drawing the fibre has a draw error within the range of ±20% of a set point diameter of the fibre. Preferably, the draw error is within the range of ±15% of the set point diameter of the fibre. More preferably, the draw error is within the range of ±12% of the set point diameter of the fibre. Most preferably, the draw error is within the range of ±10% of the set point diameter of the fibre.

In an embodiment of the first or the second aspects, the low Young's modulus fibre preform has a hollow core structure, and prior to the step of feeding the low Young's modulus material to the draw zone, the method initially includes:

forming a paraxially aligned arrangement of a plurality of hollow tubes of a low Young's modulus material in a configuration corresponding to the hollow core structure;

heating the plurality of tubes to a temperature above the glass transition temperature of the low Young's modulus material; and baking the plurality of tubes at the temperature for a time sufficient to sinter the plurality of tubes and form the low Young's modulus fibre preform.

In one form of the above embodiment, the plurality of tubes does not include a paraxial jacket. However, in alternative forms, the plurality of tubes are formed within a paraxial jacket of the low Young's modulus material.

In various forms of the above embodiment, the paraxially aligned arrangement is a coaxially aligned arrangement.

In an embodiment of the first or the second aspects, the low Young's modulus fibre preform has a hollow core structure, and prior to the step of feeding the low Young's modulus material to the draw zone, the method initially includes:

forming a paraxially aligned arrangement of a plurality of hollow tubes of a low Young's modulus material within a paraxial jacket of the low Young's modulus material, and in a configuration corresponding to the hollow core structure;

heating the plurality of tubes to a temperature above the glass transition temperature of the low Young's modulus material; and baking the plurality of tubes at the temperature for a time sufficient to sinter the plurality of tubes and the jacket, and form the low Young's modulus fibre preform.

In various forms of the above embodiment, the paraxially aligned arrangement and the paraxial jacket are a coaxially aligned arrangement and/or a coaxially aligned.

In an embodiment of the first or second aspects, the step of drawing the fibre includes drawing the fibre to a fibre diameter of less than 1 mm. Preferably, the fibre diameter is less than 0.8 mm. Most preferably, the fibre diameter is less than 0.5 mm.

In a third aspect of the invention, there is provided a fibre formed from a low Young's modulus material according to the method of first or second aspects, and/or embodiments thereof.

In an embodiment of the first, second, or third aspects of the invention, the fibre is an optical fibre.

In a fourth aspect of the invention, there is provided an optical fibre sensor device including an optical fibre formed from a low Young's modulus material according to the method of first or second aspects, and/or embodiments thereof.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The present invention relates to a method of fibre drawing for fabricating low Young's modulus (YM) materials into fibre. To an experienced fibre-drawing expert, low YM materials are incompatible with current fibre drawing techniques. However, the inventors have now found that fibre drawing processes may be used to form fibres from low YM materials by adopting low draw tensions to maintain the neck down position within a draw zone of a fibre drawing apparatus.

Figure 8:
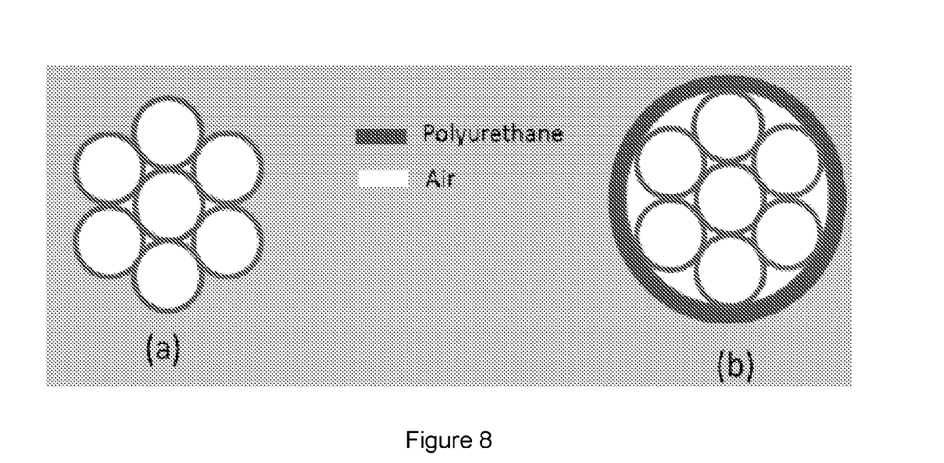
FIG. 8: Schematic of a polyurethane fibre (a) without jacket and (b) with jacket.

Whilst the method of the invention may be applied to a range of different types of low YM fibres, the invention will now be described generally with reference to microstructured optical fibres (MOFs). A basic hollow core structure of a MOF is shown in FIG. 8. Briefly, MOFs are formed using a process in which a guiding mechanism is determined by a pattern of air holes in the resultant fibre. The most popular method of drawing microstructured fibres is the "stack-and-draw" method, where tubes are stacked within a larger outer jacket tube. These individual tubes are fused together in the drawing furnace at the time of drawing.

The first step of drawing the fibre is to put the preform into a draw zone (e.g. a furnace or hot zone) of a draw tower. In general, the preforms made with high YM materials are put into the furnace of the draw tower and allowed some time to heat to the drawing temperature. This stage is generally known as a "preheat stage" which allows the high YM material to soften before drawing commences. In comparison, a low YM preform can be stretched at room temperature, which could cause both elastic of plastic deformation depending on the applied tension. Therefore, for low YM materials a preheat stage may not be required in some instances, e.g. for some low YM materials the preform is fed into the draw zone at an ideal drawing temperature and starts drawing immediately.

A very wide range of simple or complicated microstructures with low YM materials can be fabricated using the methods of the invention. By way of example, the inventors have prepared microstructures with different numbers of air holes, anti-resonant structures, and structure with metal wires inside the holes, such as those disclosed in A. Stefani, R. Lwin, B. T. Kuhlmey, and S. C. Fleming, "OAM generation, tunable metamaterials and sensors with highly deformable fibers," in Advanced Photonics 2018 (BGPP, IPR, NP, NOMA, Sensors, Networks, SPPCom, SOF), OSA Technical Digest (online) (Optical Society of America, 2018), paper number Th1D.2 (the entire contents of which are hereby incorporated by reference). The present invention may be adapted to form low YM fibres possessing complicated microstructures such as these using the methods of the invention.

The methods of the invention may be applied to draw a diverse range of low YM materials into fibres, a non-limiting disclosure of suitable low YM materials include: polyurethane, poly(styrene-b-(ethylene-co-butylene)-b-styrene), and polystyrene-polyisoprene triblock copolymer.

EXAMPLES

Example 1

Figure 1:
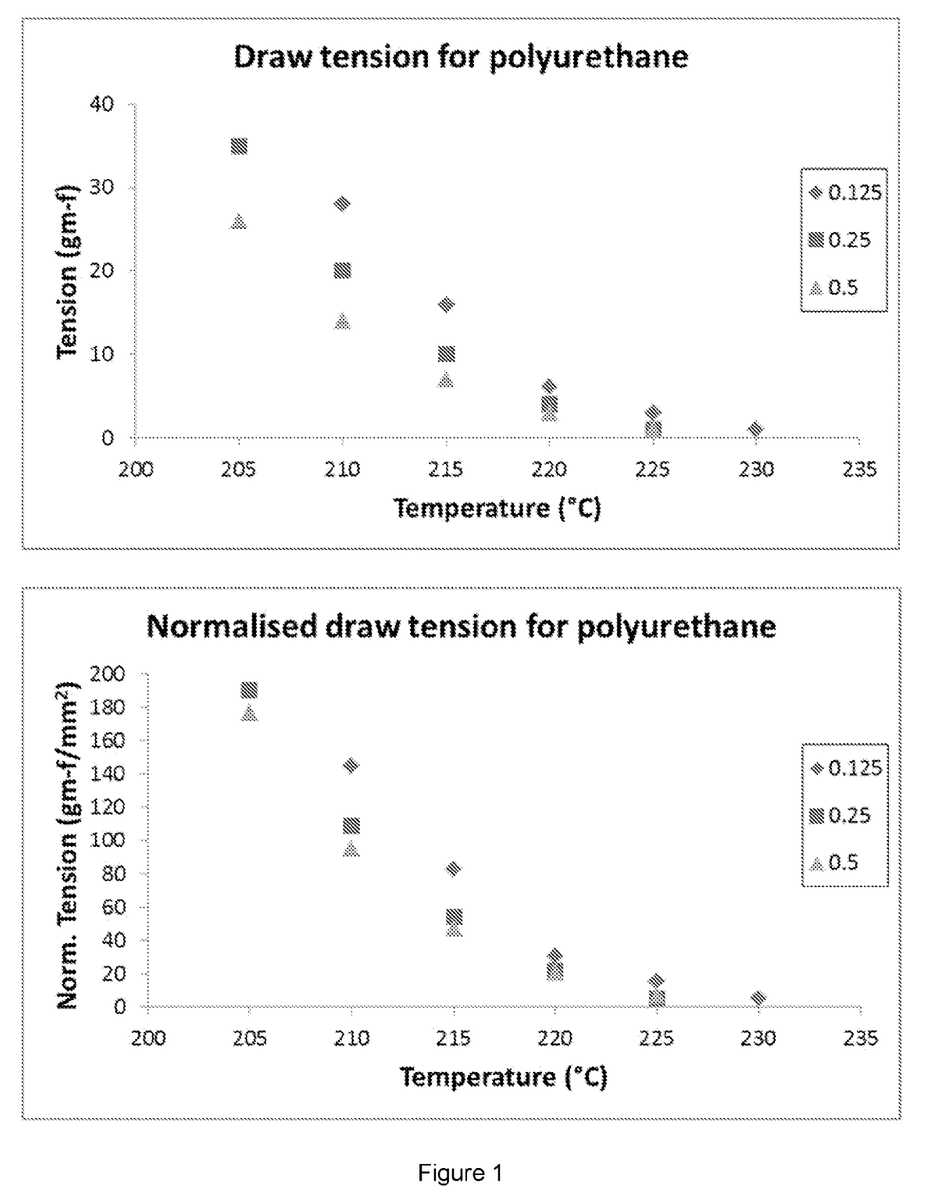
FIG. 1: graph showing (a) the draw tension and (b) the normalised draw tension of polyurethane of different Inner to Outer Diameter ratio for different furnace temperatures.
Figure 2:
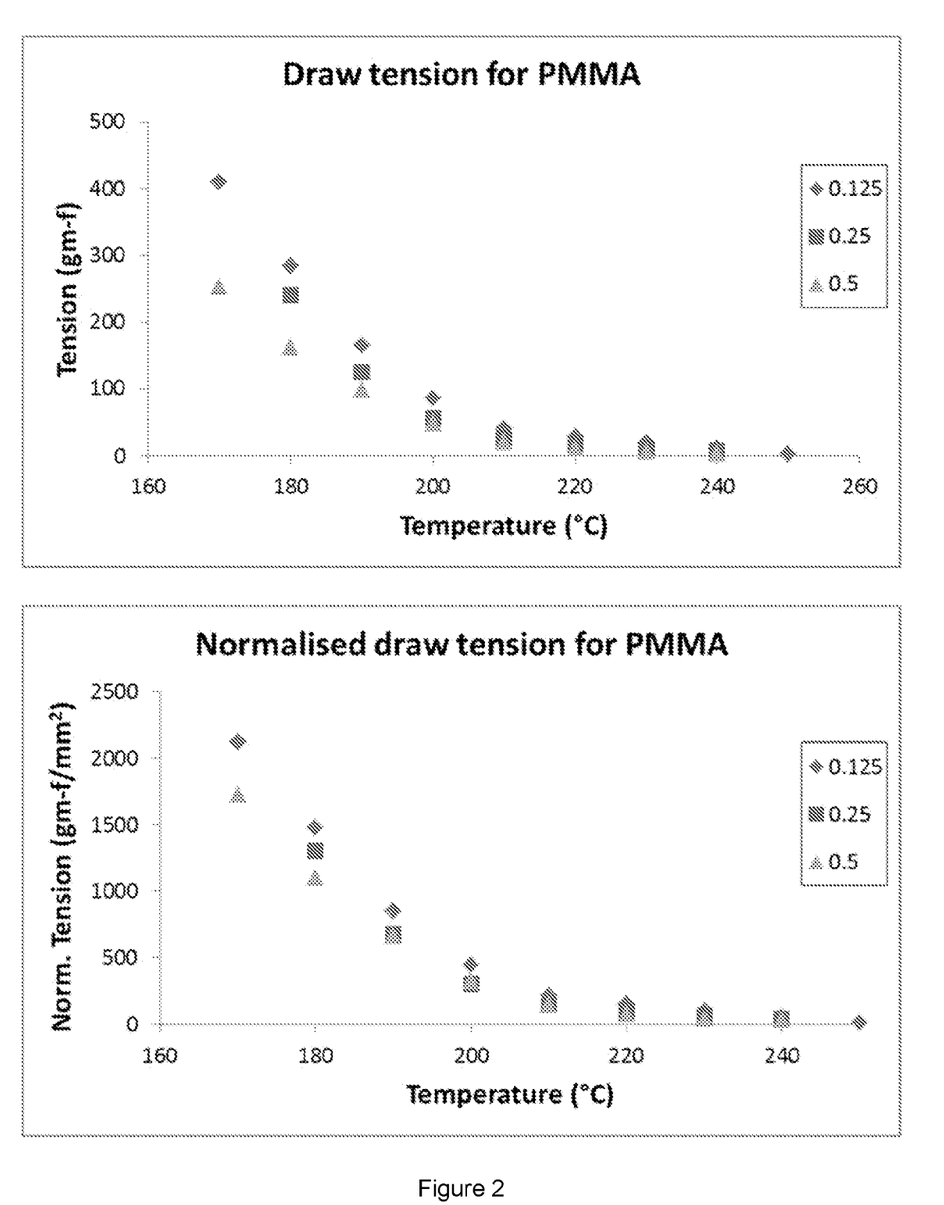
FIG. 2: graph showing (a) the draw tension and (b) the normalised draw tension of PMMA of different Inner to Outer Diameter ratio for different furnace temperatures.

Draw Tension for Polyurethane and PMMA of Different Inner Diameter to Outer Diameter Ratio (ID/OD) at Different Furnace Temperatures Polyurethane (a low YM material of 2-30 MPa) and PMMA (a high YM material of 2-5 GPa) preforms of different ID/OD were drawn to fibre at different furnace temperatures to observe their effects on draw tension. All preforms were of 6 mm outer diameter. Different inner diameters of 3 mm, 1.5 mm and 0.75 mm were used to create preforms with different ID/OD of 0.5, 0.25 and 0.125 respectively. All fibre draws had a fixed feed rate of 10 mm/min, with furnace temperature varying between 205-230° C. for polyurethane and 170-250° C. for PMMA. The final target fibre diameter was 300 μm. The draw tension was monitored as the furnace temperature was changed. FIG. 1 and FIG. 2 shows the effects furnace temperature has on draw tension for different ID/OD polyurethane and PMMA respectively. The normalised tensions against their ID/OD are shown as well.

From FIG. 1 and FIG. 2, it can be seen that the Draw Tension in all cases increases as furnace temperature decreases as expected. Also lower ID/OD leads to a lower draw tension at each set furnace temperature since there is less bulk cross-section material to heat and stretch. The draw tensions were normalized against their ID/OD in order to compare the draw tension for both materials. It can be seen that a distinct trend is achieved irrespective of their ID/OD, indicating the draw tensions are dependent on the bulk material characteristics.

Diameter Error for Different ID/OD at Different Tensions

FIG. 1 and FIG. 2 showed that fibres can be drawn at a wide range of furnace temperatures for a given feed rate and starting preform diameter. However the final target fibre diameter also has to be consistent. Variations greater than ±10% from the final target fibre diameter are generally considered unacceptable, and indicate an inability to maintain structural integrity of the internal structure of complex multi-hole fibres. These variations can be attributed to the following reasons: not achieving steady state conditions, draw tensions too high that preform cannot be drawn to fibre leading to snapping, or draw tensions too low causing slumping due to fibre drawing faster than the prescribed draw rate.

Figure 3:
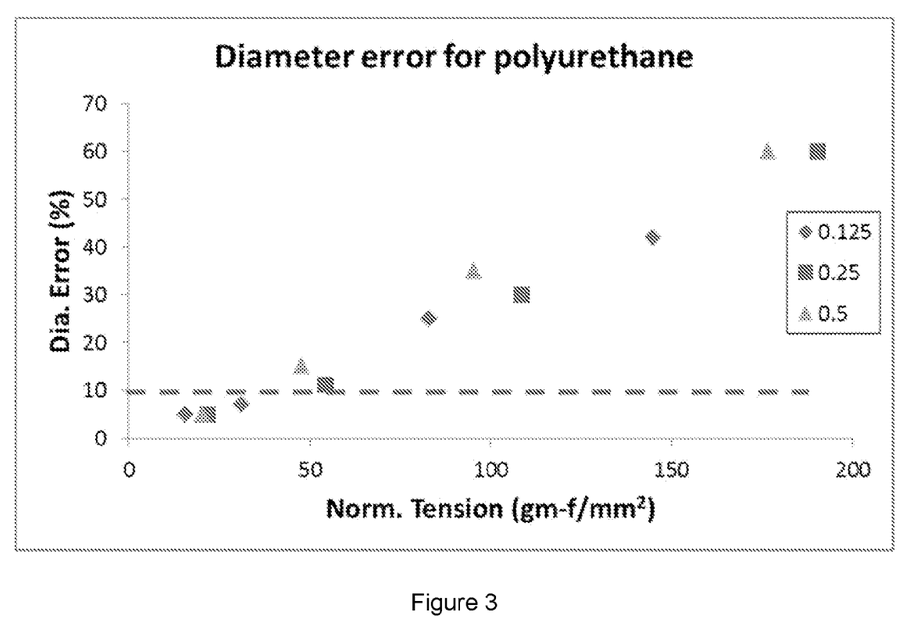
FIG. 3: graph showing diameter error at different normalised tensions for polyurethane of different ID/OD.
Figure 4:
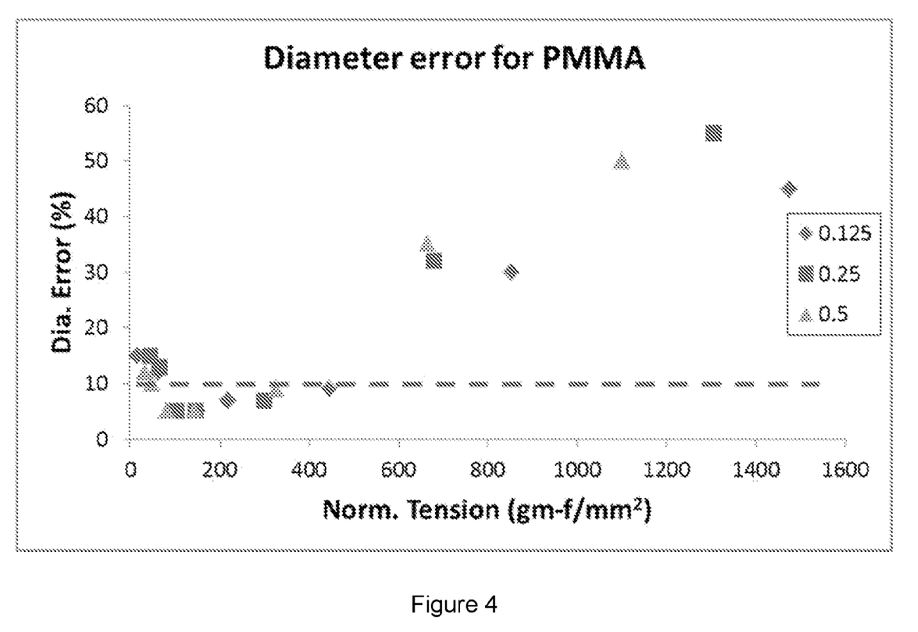
FIG. 4: graph showing diameter error at different normalised tensions for PMMA of different ID/OD.
Figure 5:
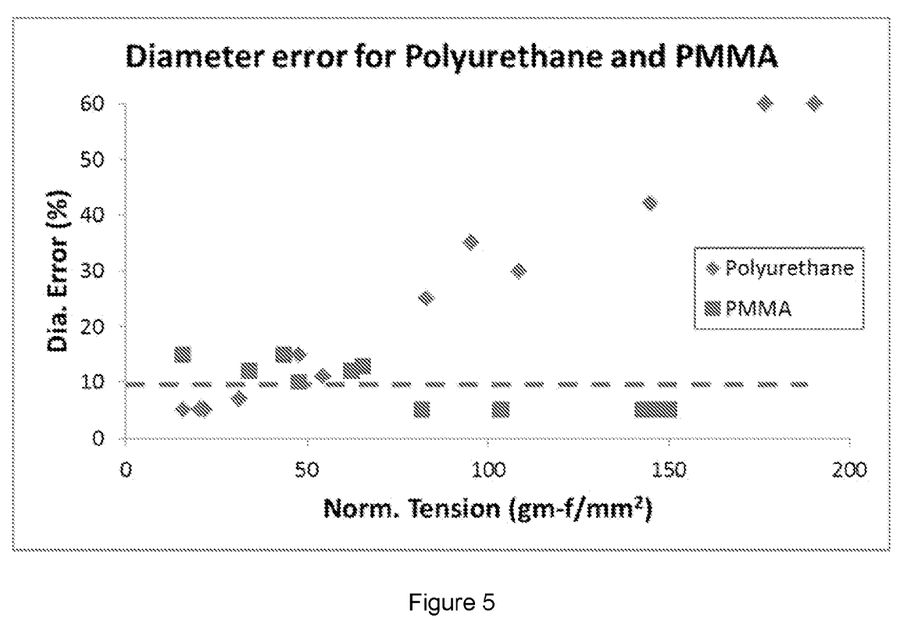
FIG. 5: graph comparing diameter error at different normalized tensions for polyurethane and PMMA.

FIG. 3 and FIG. 4 show the diameter error at different normalized tensions for both polyurethane and PMMA of different ID/OD respectively. As expected, the errors increase as tension increases due to the material being stiffer and hence more difficult to pull and maintain diameter leading to snapping. A dotted line at 10% diameter error is added to indicate the normalised tensions that still achieve consistent diameters. For both polyurethane and PMMA, the diameter error is dependent on the material properties rather than the ID/OD. An exploded view of the diameter error against normalized tension up to 200 gm-f/mm$^2$ for both polyurethane and PMMA is shown in FIG. 5. It shows opposite trends for each material whereby PMMA produces acceptable diameter error for normalized tensions above 50 gm-f/mm$^2$, and generally improves the larger the tension, while polyurethane is better for normalized tension below 50 gm-f/mm$^2$, and generally improves for lower tensions. Furthermore, for normalized tensions below 50 gm-f/mm$^2$, PMMA suffers from fibre slumping, whereby the speed of the drawn material is moving faster than the draw rate.

Effects of Different Feed Rate

Figure 6:
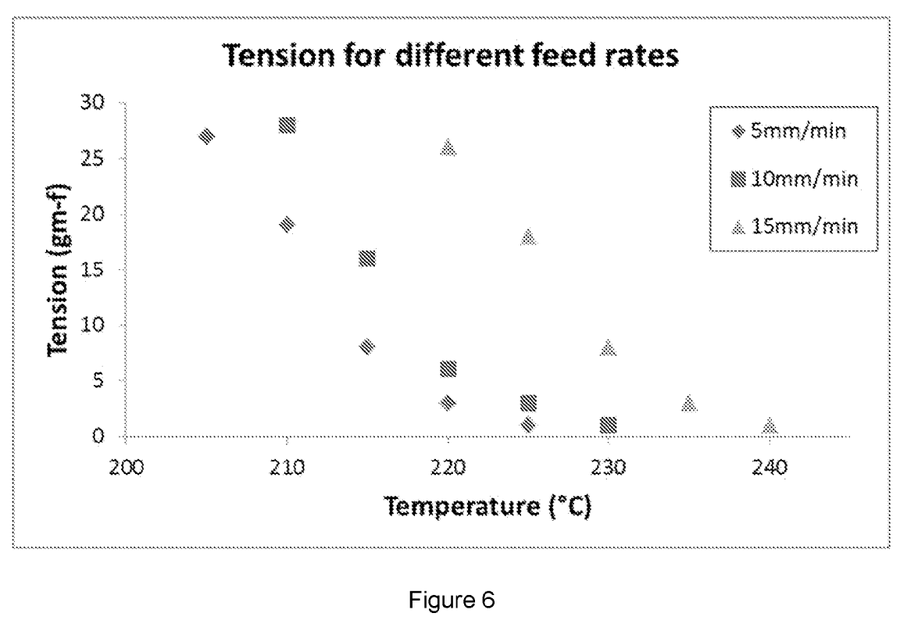
FIG. 6: graph showing draw tension for polyurethane at different feed rates.
Figure 7:
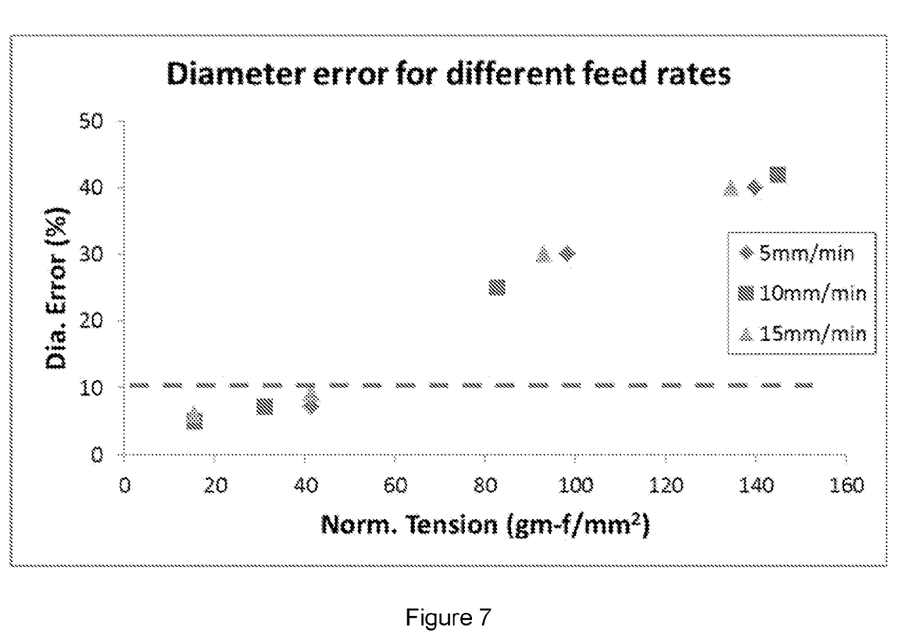
FIG. 7: graph showing diameter error for polyurethane at different feed rates

The rate the preform enters the furnace also affects the draw tension as it changes the amount of time the neck down is allowed to heat to drawing temperature. The polyurethane preforms were fed at 5, 10 and 15 mm/m in into the furnace at different temperatures. All the preforms had an outer diameter of 6 mm and inner diameter of 0.75 mm (ID/OD 0.125) and were drawn down to a final target diameter of 500 μm. FIG. 6 shows the draw tension greatly affected by the feed rate, whereby the faster feed rate shifts the required temperature to a higher range since the neck down has less time to heat up. FIG. 7 shows the diameter error from target 500 μm. Once again, like the results in FIG. 3, the diameter error is greatly dependent on the material's tension rather than the feed rate used. Also the draw conditions with normalised tensions below 50 gm-f/mm$^2$ achieve acceptable diameter consistency.

Discussion

Polyurethane and PMMA preforms can be drawn to fibre under a variety of draw conditions. However there are only small windows of ideal conditions that will guarantee the production of successful fibre of consistent diameter. Firstly the inventors observed that the material properties (i.e. Young's modulus) for both polyurethane and PMMA are more important to the draw tension compared to the ID/OD of the preform. It only requires changes in the furnace temperature to compensate for differences in ID/OD. Secondly, of the range of normalised tension achieved, only specific regimes are suitable for achieving consistent diameter fibre. In the case of PMMA a range between 50-200 gm-f/mm$^2$ is suitable, while for polyurethane it is restricted to extremely low tension of under 50 gm-f/mm$^2$. Overall this can be attributed to polyurethane's inherent low Young's modulus that leads to draw conditions that cannot be achieved with PMMA.

Example 2

This example reports the drawing of a polyurethane preform with a hollow core structure as shown in FIG. 8 in comparison with a PMMA preform having a similar structure.

In this example, prior to drawing the low YM fibre, the inventors additionally subjected the low YM preform to a pre-treatment step in which individual tubes of the low YM material that form the hollow core structure are subjected to a heat treatment step where the tubes are bundled together and annealed in an oven to fuse the interface between the tubes. This is important to ensure the structure holds together during the drawing process. Practically, this is an important step to successful fabrication of low YM fibres. An additional benefit of this process is that it allows creation of jacketless fibres from low YM materials, which is potentially important for applications that require more sensitivity as this fibre structure can be more easily deformed by external perturbations.

The pre-treatment step included arranging the polyurethane tubes into the hollow core structure, and then baking this structure in an oven ~140° C. for half an hour. This temperature was chosen as it is significantly higher than the glass transition temperature of polyurethane, allowing the adjacent polyurethane tubes to adhere together rapidly. Notwithstanding this, the skilled addressee will appreciate that the choice of oven temperature and duration are dependent on the nature of the low YM material, and whether the interface between the tubes adheres together without deforming them. This method for fabricating preforms can also be used for other materials, including high YM materials such as PMMA.

Polyurethane and PMMA preforms were drawn from a preform in a draw tower. The furnace temperature, draw tensions, and results are summarised in Table 1 below.

TABLE 1

Polyurethane and PMMA draw conditions

| Furnace Temp (° C.) | Draw Tension (gm-f) | Approximate Normalised Draw Tension (gm-f/mm²) | Results |
|---|---|---|---|
| Polyurethane fibre draw conditions | | | |
| 208 | 30 | 204 | High levels of diameter fluctuations (±50%) and then snap |
| 211 | 15 | 101 | Diameter fluctuations (±20%) |
| 215 | 6 | 20 | Consistent diameter |
| 220 | 2 | 13 | Consistent diameter |
| 225 | 1 | 6 | Fibre slump |
| PMMA fibre draw conditions | | | |
| 171 | 285 | 1935 | High levels of diameter fluctuations (±50%) and then snap |
| 185 | 138 | 937 | Diameter fluctuations (±20%) |
| 202 | 65 | 441 | Consistent diameter |
| 210 | 30 | 203 | Consistent diameter |
| 223 | 15 | 101 | Fibre slump |
| 235 | 7 | 47 | Fibre slump |
| 255 | 3 | 20 | Fibre slump |

The results show that polyurethane preform can be successfully drawn at a constant tension below 6 gm-f. The resulting structures were maintained over lengths in excess of 10 m. Fibres were drawn to an external diameter of 500 μm, with a fibre diameter uniformity of ±10 μm. For comparative purposes, the PMMA fibre required >30 gm-f of draw tension.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An optical fibre drawing method for forming an optical fibre from a low Young's modulus preform consisting of one or more low Young's modulus material(s), the method including:
    feeding the low Young's modulus preform into a draw zone of a fibre drawing apparatus; and
    drawing an optical fibre from the low Young's modulus preform under a normalised tension of 50 gm-f/mm2 or less,
wherein the low Young's modulus preform has a Young's modulus of 300 MPa or less at room temperature.

2. The method of claim 1, wherein the normalised tension is 40 gm-f/mm2 or less.

3. The method of claim 2, wherein the normalised tension is 25 gm-f/mm2 or less.

4. The method of claim 1, wherein the method includes maintaining a neck down region of the low Young's modulus material preform at a neck down position within the draw zone.

5. The method of claim 1, wherein the low Young's modulus preform has a Young's modulus of 100 MPa or less.

6. The method of claim 5, wherein the low Young's modulus preform has a Young's modulus of 10 MPa or less.

7. The method of claim 1, wherein the low Young's modulus preform is drawn at a draw temperature such that the low Young's modulus preform is viscous.

8. The method of claim 7, wherein the draw temperature is above the glass transition temperature of the low Young's modulus preform.

9. The method of claim 1, wherein the one or more low Young's modulus material(s) are selected from the group consisting of: a polymer, rubber, silicone compound, or hydrogel.

10. The method of claim 9, wherein the low Young's modulus material is a polymer.

11. The method of claim 10 wherein the polymer is a thermoplastic elastomer selected from the group consisting of: polyurethane, poly(styrene-b-(ethylene-co-butylene)-b-styrene), and polystyrene-polyisoprene triblock copolymer.

12. The method of claim 1, wherein the step of drawing the optical fibre has a draw error within the range of ±20% of a set point diameter of the optical fibre.

13. The method of claim 12, wherein the draw error is within the range of ±10% of the set point diameter of the optical fibre.

14. The method of claim 1, wherein the one or more low Young's modulus material(s) are provided in a form having a hollow core structure, and prior to the step of feeding the low Young's modulus preform to the draw zone, the method includes:
    forming a paraxially aligned arrangement of a plurality of hollow tubes of the one or more low Young's modulus material(s) in a configuration corresponding to the hollow core structure;
    heating the plurality of tubes to a temperature above the glass transition temperature of the one or more low Young's modulus material(s); and
    baking the plurality of tubes at the temperature for a time sufficient to sinter the plurality of tubes, and form the low Young's modulus preform.

15. The method of claim 1, wherein the step of drawing the optical fibre includes drawing the optical fibre to a fibre diameter of less than 1 mm.

* * * * *